(12) United States Patent
Igarashi

(10) Patent No.: US 6,932,318 B2
(45) Date of Patent: Aug. 23, 2005

(54) FLOW CONTROL DEVICE

(75) Inventor: Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 87 days.

(21) Appl. No.: 10/608,256

(22) Filed: Jun. 27, 2003

(65) Prior Publication Data

US 2004/0004199 A1 Jan. 8, 2004

(30) Foreign Application Priority Data

Jul. 3, 2002 (JP) ........................................ 2002-194858

(51) Int. Cl.[7] ............................................ F16K 31/165
(52) U.S. Cl. ........................ 251/60; 251/61.3; 251/63.4; 251/63.5
(58) Field of Search ................ 251/60, 61, 61.2, 251/61.3, 62, 63.4, 63.5

(56) References Cited

U.S. PATENT DOCUMENTS

| | | | |
|---|---|---|---|
| 2,876,937 A | | 3/1959 | Wilson |
| 3,512,550 A | * | 5/1970 | Ammann .................... 137/553 |
| 3,724,807 A | | 4/1973 | Jackson |
| 4,287,812 A | * | 9/1981 | Iizumi .......................... 91/420 |
| 4,548,382 A | | 10/1985 | Otting |
| 4,635,897 A | | 1/1987 | Gallant |
| 4,682,755 A | | 7/1987 | Bernstein et al. |
| 4,824,072 A | | 4/1989 | Zakai |
| 4,953,824 A | | 9/1990 | Baumann |
| 5,441,231 A | | 8/1995 | Payne et al. |
| 5,549,793 A | | 8/1996 | Hellstrom et al. |
| 6,047,943 A | | 4/2000 | Hussey |

FOREIGN PATENT DOCUMENTS

| | | |
|---|---|---|
| CA | 2150629 | 2/1996 |
| JP | 2-84071 | 3/1990 |
| JP | 4-252850 | 9/1992 |
| JP | 195 22 488 | 2/1996 |
| JP | 9-311726 | 12/1997 |
| JP | 11-37339 | 2/1999 |
| JP | 200035145 A | 2/2000 |
| JP | 2000-95667 | 4/2000 |

* cited by examiner

*Primary Examiner*—Justine R. Yu
*Assistant Examiner*—Peter deVore
(74) *Attorney, Agent, or Firm*—Thelen Reid & Priest, LLP

(57) ABSTRACT

A flow control device comprises an inlet port through which fluid is supplied, an outlet port through which the fluid is delivered, a valve body which is arranged in a passage between the inlet port and the outlet port so as to open and close the passage, the flow control device further comprising a valve body guide means which urges downwardly and pulls upwardly the valve body so as to allow the fluid in the passage to flow at a flow rate which is lower than a basic control rate of the flow control device.

5 Claims, 4 Drawing Sheets

FLOW CONTROL DEVICE

CROSS-REFERENCE TO RELATED APPLICATION

This application claims priority to Japanese patent application no. 2002-194858, filed on Jul. 3, 2002, entitled: Flow Control Device and was not published in English.

BACKGROUND OF THE INVENTION

1. Field of the Invention

The invention relates to a flow control device for controlling the flow rate of a fluid, such as a chemical agent, dematerialized water, etc.

2. Background Art

FIG. 4 is a cross sectional view of a conventional flow control device, showing an example of a structure of the flow control device. This flow control device 1 is located in a fluid supply line for mixing a plurality of liquid agents, and also for controlling a flow rate of dematerialized water, etc., which is used in a product process for products. The flow control device is generally called a regulator.

A construction of the flow control device 1 will be explained more specifically. A housing 10 which forms the exterior of the flow control device 1 is formed by a material such as a resin, etc. An inlet port 21 and an outlet port 24 are arranged outside of the housing 10. Essential parts of the flow control device 1 are a valve seat 11 having an opening plane 11a which communicates with the inlet port 21, a valve body 30 which is movable perpendicular (upward and downward in FIG. 4) to the opening plane 11a of the valve seat 11, a diaphragm 35 which is fixed with the upper end of the valve body 30 so as to control a pressure, and a coil spring 36 which presses the valve body 30 to the valve seat 11, arranged inside of the housing 10. As shown in FIG. 4, the valve body 30 is separated into two portions.

A passage through which a fluid flows provides a first cavity 22 (generally called a valve chamber) and a second cavity 23 which communicates with the outlet port 24 between the valve seat 11 and the diaphragm 35. A pressure chamber 12 is arranged on one side, which opposes the second cavity 23, of the diaphragm 35; that is, the pressure chamber 12 is arranged at an upper side of the diaphragm 35 as shown in FIG. 4 and the pressure chamber 12 communicates with a pressure inlet port 13 which is formed in an upper part of the housing 10.

Additional constructions of the valve body 30 and functions of the valve body will be further explained.

The valve body 30 is movable upward and downward in FIG. 4 and is urged by the coil spring 36, which is arranged in a lower portion of the valve body 30, upwardly so as to touch the valve seat 11. According to the construction of the valve body 30 thus constructed, the opening plane 11a of the valve body 30 firmly contacts an outer surface of the valve body 30 so as to close the valve seat 11.

A top portion of the valve body 30 projects upward, and a male screw portion 30a is formed in the top portion thus projected. The valve body 30 is connected with the diaphragm 35 by engaging the male screw 30a with a female screw 35a which is formed in the diaphragm 35. Other constructions in which the valve body 30 is not connected with the diaphragm 35 are possible.

While urging fluid such as compressed air is supplied to the pressure inlet port 13, the pressure chamber 12 is pressurized and urges the diaphragm 35 downward by a force, caused by the compressed air, greater than an elastic force of the coil spring 36 which urges the diaphragm 35 upward. The diaphragm 35 thus urged moves the valve body 30 so as to depart from the valve seat 11 and also to open the opening plane 11a of the valve seat 11, and then, fluid in the first cavity 22 flows into the second cavity 23. A vertical moving distance of the valve body 30 is controlled due to the pressure of the fluid which presses the pressure chamber 12, and therefore, the flow rate of the fluid which flows through the opening plane of the valve seat 11 can be controlled by the pressure of the fluid. The fluid thus flowing into the second cavity 23 flows toward the outlet port 25, then a flow rate of the fluid which is supplied by the flow control device 1 is controlled.

The above flow control device 1 can block the flows of the fluid by closing the opening plane 11a of the valve seat 11 by the valve body 30 so as to close the passage fluid. However, the fluid tends to remain in the passage in the flow control device 1 and a flow line in which the flow control device 1 is arranged in a state in which the passage is closed by the valve body 30. Considering the fluid being retained in the flow control device 1, which is in a state in which the passage is closed, bacteria may grow, and such bacteria tend to cause adverse effects.

In order to discharge the fluid thus retained in the flow line, a bypass line may be arranged parallel to the flow control device 1. However, it is not possible to discharge the fluid retained in the flow control device 1 by the above bypass line, and a problem of complication of the fluid line arises.

Furthermore, another flow control device in which a bypass line for discharging a fluid is arranged therein has been designed. However, fluid may remain in a main passage between the ends of the bypass line, and therefore, further improvement which ensures discharge of the retained fluid is desired.

As another process for discharging the remaining fluid, it is possible to supply a small amount of compressed air to the pressure chamber 12 so as to move the diaphragm 35 and also to slightly open the opening plane 11a of the valve seat 11. However, because the above fluid control device 1 is designed for controlling a flow within a predetermined basic flow control rate and diaphragm 35, etc., are also designed for the predetermined basic control rate, it is difficult to control the flow rate for discharging the retained fluid which is below the predetermined basic flow control rate. That is, the diaphragm 35 which is specialized for the predetermined flow rate cannot control a small flow which is below the predetermined flow rate and cannot maintain stability of the flow.

In contrast, in a case where the diaphragm 35 is designed for controlling a slight flow, it becomes difficult to control the flow rate of fluid which flows at the predetermined basic control rate. That is, accuracy of flow control tends to be decreased by increasing the range of the control rate.

Because it is difficult to control the slight flow of the fluid in the conventional flow control device 1, it is necessary to flow the fluid through the flow control device 1 at the predetermined basic control rate in which a relatively large amount of fluid flows.

SUMMARY OF THE INVENTION

The present invention is made in view of the above problems and seeks to reduce the fluid remaining in the flow control device and the passage in which the flow control device is located. The present invention also seeks to provide a flow control device which can precisely control the flow rate in a suitable state so as to supply the fluid.

To attain the above objects, in an aspect of the present invention, a flow control device has an inlet port through which fluid is input, an outlet port through which fluid is output, a valve body which is arranged in a passage between the inlet port and the outlet port so as to open and close the passage, the flow control device further having a valve body guide means which moves the valve body so as to allow the fluid in the passage to flow at a flow rate which is lower than a basic control rate of the flow control device.

In another aspect of the present invention, a flow control device has a valve body guide means which urges downwardly and upwardly the valve body.

Because the above flow control device provides the valve body guide means which moves the valve body so as to allow the fluid in the passage to flow at a flow rate which is lower than a basic control rate of the flow control device, it is possible to flow the fluid at a minimal flow rate through a housing of the flow control device so that the fluid does not remain in a passing line in the flow control device and a corresponding pipe line and also so as to avoid growth of bacteria. The fluid can flow at the minimal flow rate, and therefore it is possible to minimize loss of fluid. It is also possible to supply the necessary fluid to a destination point at an accurate flow rate and in good condition.

In another aspect of the present invention, a flow control device has a valve body guide means arranged in a direction along which the valve body moves.

In another aspect of the present invention is a flow control device has a valve body guide means is arranged coaxial to the valve body and along the moving direction of the valve body.

Because the valve body guide means is arranged coaxial to the valve body, the valve body guide means can control the valve body so as to maintain a minimal flow rate without using an excess space for moving, and it is possible to realize a flow control device having the above performances and minimal size at a low product cost.

In another aspect of the present invention is a flow control device has a fine controller which controls a moving range of movement of the valve body.

Because the fine controller which controls a range of movement of the valve body is arranged in the valve body guide means, it is possible to finely control the flow rate of the fluid passing through the passing line with a low flow rate in accordance at the kind of fluid and purpose of the fluid, and also possible to reduce loss of the fluid.

In another aspect of the present invention a flow control device has a valve body guide means having a piston which is movable relative to the valve body along an axis of the valve body, and the fine controller controls a range of movement of the piston.

In another aspect of the present invention, a flow control device has a piston pushed by compressed air.

In another aspect of the present invention, a flow control device has a pressure control diaphragm which drives a valve body by pressure of compressed air which acts on one face of the pressure control diaphragm and which can be driven by the piston.

Because the pressure control diaphragm which drives the valve body by pressure of compressed air is arranged between the valve body guide means and the valve body, it is possible to reliably divide a cavity in which the valve guide means is arranged and the passing line of the fluid by a simple mechanism. Because the valve body guide means drives the valve body out of the path line of the fluid, the fluid passing in the path line is not influenced by the valve body guide means, and it is possible to exactly maintain the basic control rate of the flow control device. It is possible to realize a flow control device, having good reliability, which can precisely control the flow rate and can also maintain the fluid in a desired state at low cost.

DESCRIPTION OF THE PREFERRED EMBODIMENTS

Hereinafter, embodiments of the flow control device of the present invention will be explained in reference with the figures.

First Embodiment

Figure 1:
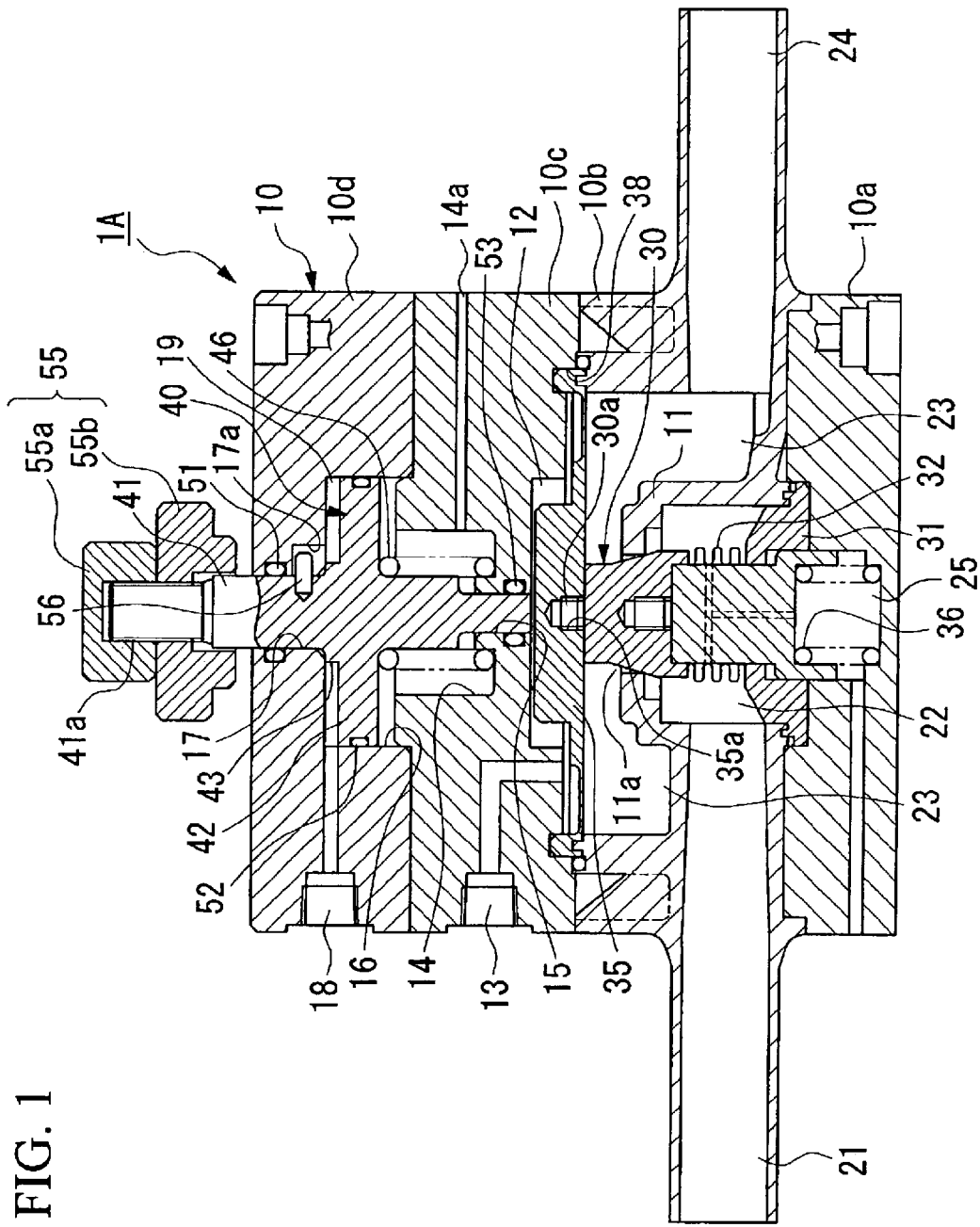
FIG. 1 is a cross sectional view of the first embodiment of the present invention which explains a structure and a mechanism of the flow control device.

FIG. 1 is a cross sectional view of the flow control device 1A of the first embodiment which explains an internal structure of the flow control device. The basic control rate of this flow control device is 4 to 35 liters per minute. The essential structure for controlling the basic control rate is basically the same as the structure of the conventional flow control device which was explained in the Background Art, and therefore, explanations for some of the essential structures are omitted and a structure and a mechanism which relate to the present invention will be specifically explained.

The housing 10 which forms the exterior of the flow control device consists of four block members, each of which is formed by resin or fluoric resin having a good chemical resistance, which are combined with each other. The block members comprise a first block member 10a and a second block member 10b which is used as a base of the flow control device, a third block member which is located above the first and second members 10a and 10b, and a fourth block member which is located above the third block member 10c. The block members 10a, 10b, 10c, and 10d are mutually stacked so as to be combined.

The inlet port 21 for introducing fluid and the outlet port 24 for delivering fluid are arranged outside of the second block member 10b. Essential components of the flow control device 1A, such as, the valve seat 11 having the opening plane 11a which communicates with the inlet port 21, the valve body having two portions which are movable perpendicular to the opening plane 11a (vertical direction in FIG. 2) and are combined with each other, and the coil spring 36 which pushes the valve body 30 against the valve seat 11 are arranged in the second block member 10b. The numeral 31 indicates a ring shaped guide member which controls an upper stroke end of the stroke of the valve body 30 so as not to move out of the predetermined stroke range.

A pressure inlet port 13 which communicates with the pressure chamber 12 which is explained in the Background Art is formed in the third block member 10c which is located above the second block member 10b. The pressure inlet port 13 of this embodiment opens in a side face of the third block member 10c in place of the pressure inlet port 13 of the Background Art which opens at the top face of the housing 10.

The diaphragm 30 is arranged so as to separate the second block member 10b and the third block member 10c; more specifically, an outer peripheral portion of the diaphragm 35 is inserted into a circular groove 38 which is formed on a bottom face of the third block 10c. The above mentioned pressure chamber 12 is arranged above the diaphragm 35.

A crevice 14 in which a piston 40 which acts as a valve body guide means and a coil spring 46 which pushes the piston 40 upward in FIG. 1 are enclosed is formed on an upper face of the third block 10c. A penetration hole 14a communicates the crevice 14 to the outside air. A bottom part of the piston 40 and the coil spring 46 are inserted in the crevice 14. In this embodiment, the piston 40 is an essential element of the valve body guide means which also comprises the elements such as spring 46, etc., and a cavity in which the piston is enclosed.

A crevice 16 having a cylindrical shape is formed in the fourth block 10d which is arranged above the third block 10c. A through hole 17 through which a shaft portion 41 of the piston 40 penetrates, and which has a diameter in accordance with the diameter of the shaft portion 41, is formed coaxially to the crevice 16. An O-ring 51 is arranged at an inner face of the through hole 17.

A second pressure inlet port 18 through which compressed air for pressing the piston 40 is supplied and arranged at a side face of the third block 10c. Specifically, a flange portion 42, the diameter of which corresponds with the diameter of the crevice 16 is formed on a periphery of the piston 40.

A chamber which is enclosed by the inner face of the crevice 16 and the upper face (upper side in FIG. 1) of the flange portion 42 acts as a second pressure chamber 19 into which the compressed air is supplied so that the piston 40 is pushed and is driven along an axis of the piston 40. In addition to the O-ring 51 on the shaft portion 41, an O-ring 52 is arranged on an outer periphery of the flange portion 42.

A top face of the piston 40, to which the compressed air is supplied, acts as an area to be urged by the compressed air. A force to urge the piston 40 downwardly in FIG. 1 is increased by the compressed air which presses the area which is located to one side (upper side in FIG. 1) of the piston 40. The piston thus forced by the compressed air is forced upwardly in FIG. 1 by the coil spring 46 which is arranged at the other side, which faces to the third block member 10c, of the piston 40. Therefore, if the force of the compressed air is more than the force of the coil spring 46, the piston can move downwardly and an end of the stroke of the piston 46 is limited by a position of a dial 55.

The shaft portion 41 and the flange portion 42 are integrated by an intermediate portion 43 the diameter of which is greaten than that of the shaft portion 41 and is less that of than the flange portion 42. The intermediate portion 43 touches with a top inner face of the crevice 16 so that a minimum volume of the second pressure chamber 19 is maintained and a pressure of the air which is supplied from the second pressure inlet port 18 can usually act on an area of the piston 40.

The dial 55 which acts as a fine controller has a female screw portion for engaging with a male screw portion 41a which is formed in an upper portion which projects above the housing 10 so that the dial 55 can engage with the upper portion of the shaft portion 41.

The dial 55 comprises a dial part 55a which is arranged in a top portion of the dial 55 and a locking portion 55b which is arranged in a bottom portion of the dial 55. The dial 55 can be tightly fixed at an arbitrary position in the male screw 41a of the shaft portion 41 by engaging the dial part 55a with the locking portion 55b in a double nut locking manner so as not to turn. A bottom face of the dial 55 is thus fixed to the shaft portion 41 apart from a top face of the housing 10, and therefore a stroke of the piston 40 for downward can be arbitrarily defined by a position of the dial 55.

A pin 56 is arranged in an upper part of the shaft portion 41. The pin 56 contacts a crevice 17a which is formed on an inner face of the through hole 17 of the fourth block member 10d so as not to rotate the piston 40 relative to the fourth block member 10d.

A bottom end of the shaft portion 41 of the piston 40 is inserted into a through hole 15 so as to urge the diaphragm 35 by the piston 40 which is moving downwardly by the compressed air supplied from the second pressure inlet port 18. An O-ring 53 is arranged on an inner cylindrical face of the through hole 15 so as not to leak compressed air, which is supplied into the first pressure chamber 12, to the crevice 14 in which the piston 40 is arranged.

Construction and performance of the valve body 30 thereof, and an action of the valve body relative to the piston 40, will be explained.

The valve body 30 is vertically movable in FIG. 1, and is urged from a bottom side to a top side by the coil spring 36. That is, the valve body 30 is urged toward the valve seat 11. Due to the above mechanism, the opening plane 11a of the valve seat 11 firmly contacts with the outer face of the valve body so as to close the valve seat 11. A bellow tube 32 is arranged around the valve seat 30. The bellow tube 32 encloses the valve body 30 and expands relative to the movement of the valve body 11 so that the fluid does not leak into a spring chamber 25 which is located beneath the valve body 30.

A male screw 30a projecting upward is formed on a top portion of the valve body 30. The valve body 30 is fixed to the diaphragm 35 by engaging the male screw 30a with a female screw 35a of the diaphragm 35. Other constructions in which the diaphragm 35 is not fixed with the valve body 30 are also possible.

The diaphragm 30 is urged downward due to the compressed air which is supplied into the pressure chamber 12 and cause a force which is sufficient to press the coil spring 36. That is, the force increases to be more than an elastic force of the coil spring 36, and therefore the diaphragm pushes the valve seat 36 downwardly so as to move the valve body 30 away from the valve seat 11. Due to the above action of the diaphragm 35 and the valve body 30, the opening plane 11a of the valve seat 11 opens so that the fluid flows into the second cavity 23 from the first cavity 22. Since a moving stroke of the valve body 30 can be controlled by a degree of pressurizing of the pressure chamber 12, a flow rate of the fluid passing though the opening plane 11a of the valve seat 11 within a basic control rate of 4 to 35 liters per minute, and therefore it is possible to control the flow rate of the fluid which is delivered from the outlet port 25.

Figure 2:
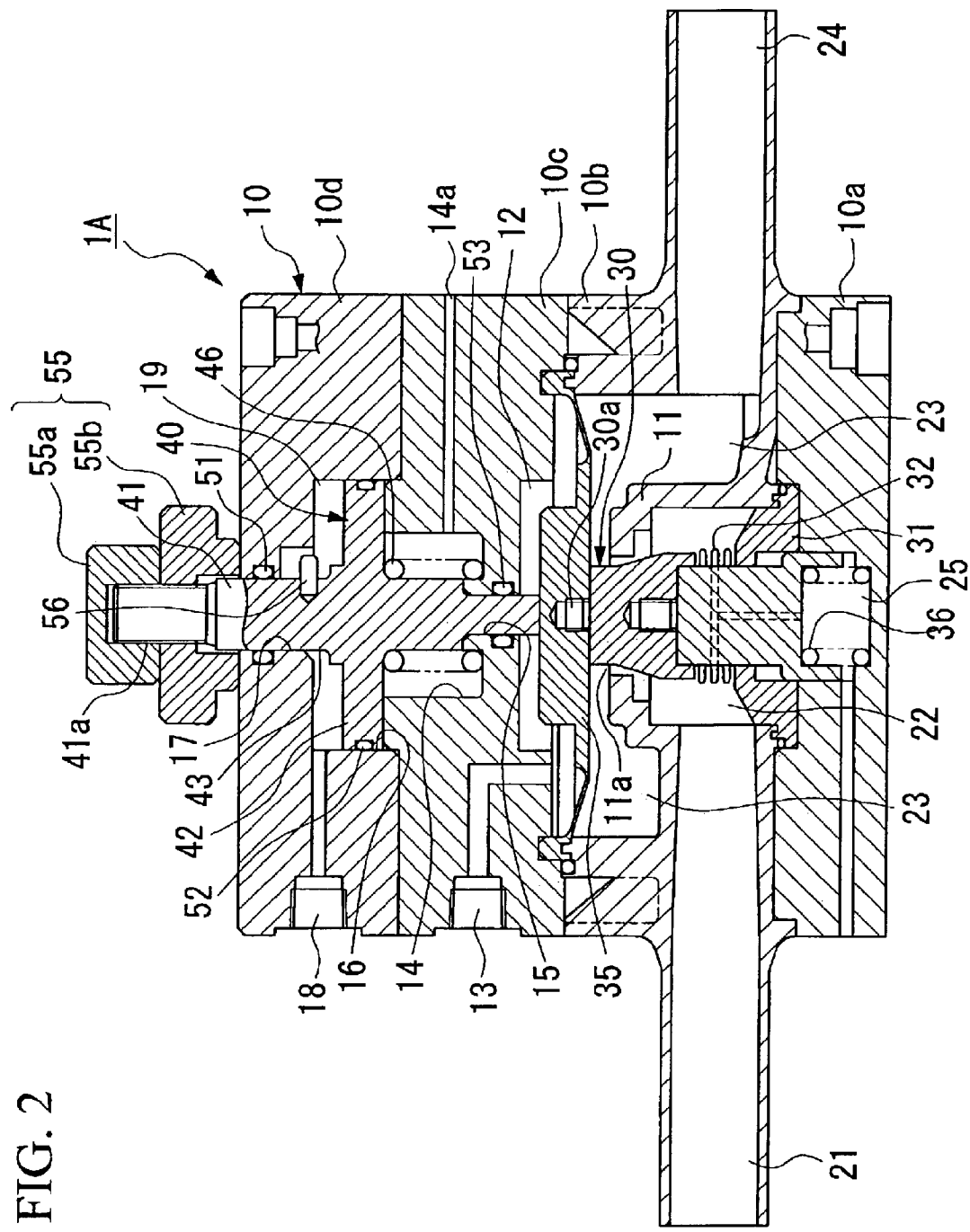
FIG. 2 is a cross sectional view of the flow control device as shown in FIG. 1 explaining an action of the flow control device in a case where the flow control device maintains a slight flow of fluid.

In a period while the compressed air for controlling the flow rate is not supplied from the pressure inlet port 13, compressed air for fine control is arbitrarily supplied from the pressure inlet port 18 for minimal controlling of the piston 40. The pressure of the compressed air thus supplied is 300 to 400 kPa (kilo pascal) and the compressed air of this pressure range presses a pressurized area of the piston 40 downwardly. A S a result, the piston 40 is pushed downwardly by a force, thus generated by the compressed air, which is greater than the elastic force of the coil spring 46 which is arranged beneath the piston 40, and therefore a bottom end of the shaft portion 41 urges the diaphragm 35 downwardly as shown in FIG. 2.

A moving length of the diaphragm 35 thus moved is defined by the stroke of the piston 40 which is defined by a position of the dial 55 which is arranged in an upper portion of the shaft portion 41. Due to the above action of the diaphragm 35, the valve body 30 is separated from the valve seat 11 by a minimum distance.

A flow rate of the fluid, which is supplied from the inlet port 21 and flows into the outlet port 25, which is passing through the minimal aperture between the opening plane 11a of the valve body 11 is 0.5 liters per every minute which is in a range of 0.1 to 10% of the basic control rate of 4 to 35 liters per minute.

According to the flow control device 1A of the first embodiment thus constructed, it is possible to move the valve body 30 by the minimum stroke by supplying the compressed air which is supplied through an air supplying line which differs from the air supplying line which supplies the compressed air to the pressure inlet port 13 which mainly controls the valve body 30 in order to control a flow rate so as to be within a range of a basic control rate. Therefore, it is possible to deliver the fluid at a precise flow rate, and it is also possible not to retain the fluid in a flow line in which the flow control device is arranged.

Because the minimal flow rate is controlled by rotating the dial 55 by an arbitrary amount, it is possible to control the minimum flow rate in accordance with the kind of fluid and state of use, and it is also possible to supply the fluid while maintaining the fluid in a suitable state. Furthermore, it is possible to reduce the quantity of the fluid which is disposed so that it is not to retained in the flow control device 1A.

Figure 4:
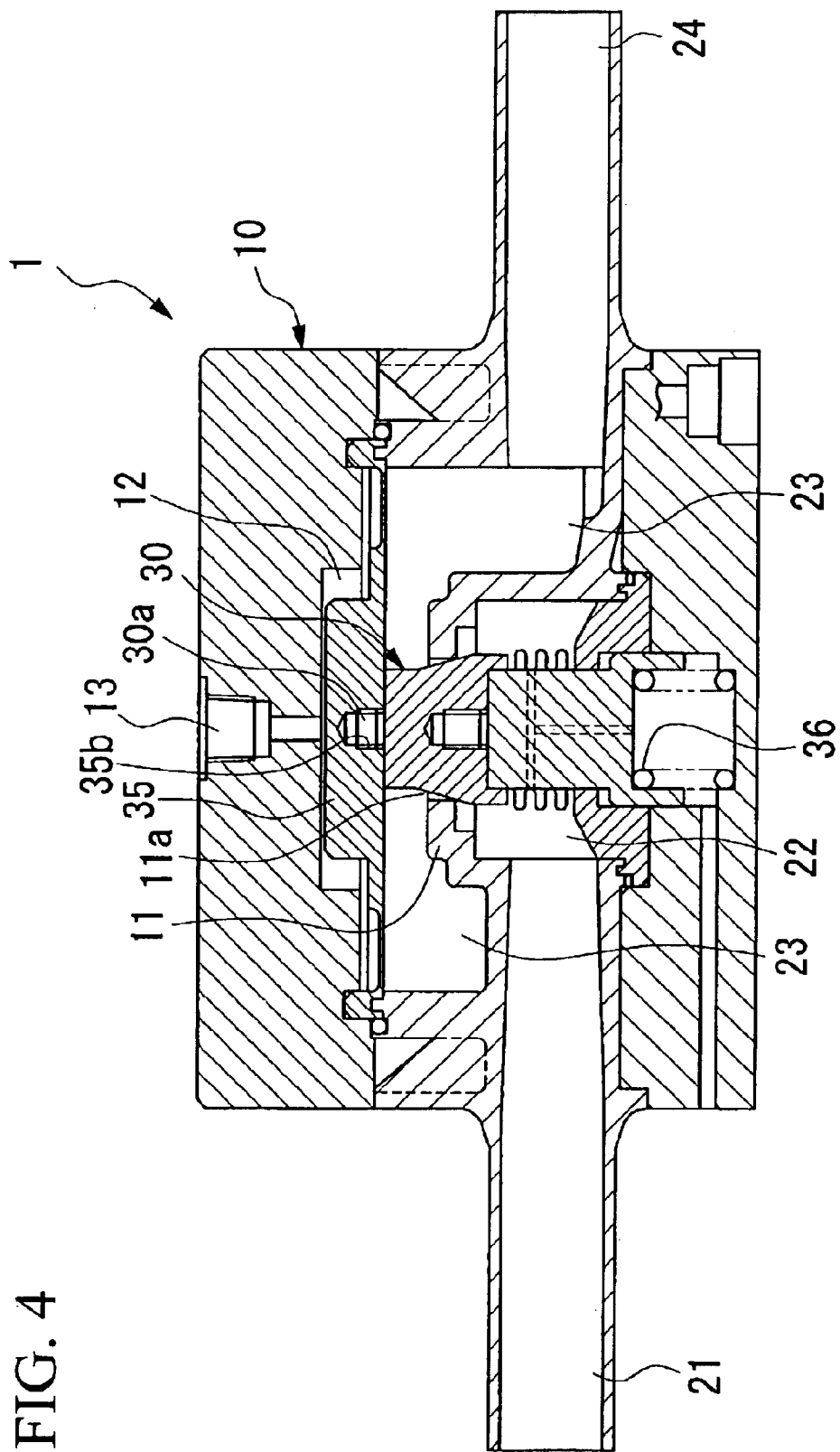
FIG. 4 is a cross sectional view of a conventional flow control device which explains a structure and a mechanism of the conventional flow control device.

In the first embodiment, the construction for controlling the fluid in the basic control rate of the flow control device 1A is similar to the construction of the conventional flow control device which is shown in FIG. 4. However, the construction for controlling the fluid in the basic control rate is not limited in the above first embodiment, and it is possible to use other mechanisms for driving the valve body and other constructions of the valve body. In other words, it is necessary for the flow control device to provide a piston which moves the valve body by minimum stroke.

Therefore, a piston 40 which is arranged beneath the valve body 30 so as to pull down the valve body 30 may also be used in place of the valve body 20 in the first embodiment which urges down the valve body 30. A coil spring 46 which is arranged above the piston 40, in place of the coil spring 46 which is arranged beneath the piston 40, so as to be deformed by the piston 40 which is driven by a second pressure inlet port 18 which is arranged beneath the piston 40 in place of the pressure inlet port 18 which is arranged above the piston 40. The flow control device thus constructed has performances similar to that of the first embodiment.

Another construction in which a piston 40 is driven by two independent compressed air lines may also be used for moving the valve body upwardly and downwardly. A modified construction of the first embodiment in which the two compressed air lines are used will be explained with reference to FIG. 1. The second air inlet port 18 is used for supplying and discharging the compressed air to the second pressure chamber 19 which is arranged above the flange 42 of the piston 40, and the penetration hole 14a which is explained as a hole for discharging air in the first embodiment is used as a third air inlet port through which compressed air in the crevice 14 is supplied and discharged in accordance with the action of the piston 40. The piston 40 is moved upwardly and downwardly by supplying the compressed air to the either of air inlet port 18 and the penetration hole 14a and also by supplying the compressed air to the other of the air inlet tube 18 and the penetration hole 14a. Because the compressed air in the crevice 14 acts as an elastic body, it becomes unnecessary to arrange the coil spring 19 to urge the piston 40 upwardly. It becomes necessary to arrange a material for sealing such as an O-ring between the third block member 10c and the fourth block member 10d in order that the compressed air in the crevice 14 not leak.

Second Embodiment

Next, the second embodiment of the present invention will be explained with reference to FIG. 3. The following explanations are for elements which are different from the first embodiment, and some of the explanations for elements common to the first embodiment are omitted by using numerals the same as in the first embodiment.

The flow control device 1A of the second embodiment mainly has top and bottom shafts 48 and 49 and a second diaphragm 45 which is arranged between the top and bottom shafts 48 which act as a valve body guide means which moves the valve body 30 in a minimum stroke.

A specific construction of the above flow control device will be explained. The bottom shaft 49 which pushes the diaphragm 35, which is fixed with the valve body 30, is inserted into the through hole 15 in a center of the crevice 14 of the third block member 10c. The bottom shaft 49 is pushed by the coil spring 46 which is arranged between the crevice 14 and a top portion of the bottom shaft 49. A second diaphragm 45 is arranged between the third block member 10c and the fourth block member 10d and is connected with the bottom shaft 49 by engaging a male screw 49a, which is formed on a top portion of the bottom shaft 49, with a female screw 45a which is formed on a bottom face of the diaphragm 45. The second pressure chamber 19 which communicates with the second pressure inlet port 18 is formed between a top face of the second diaphragm 45 and an inner face of the fourth block member 10d.

An upper face of the second diaphragm 45 is connected with the top shaft 48 which engages with the dial 55 which limits the stroke of the second diaphragm 45.

In the flow control device thus constructed, it becomes necessary to supply compressed air to the second pressure inlet port 18 by a manner similar to that in the first embodiment to permit a minimum flow which is even less than the basic control rate through the flow control device. Because an area on which the pressure of the compressed air acts is larger than an area of the piston in the first embodiment, it is possible to push,the bottom shaft 49 downwardly by the compressed air with a pressure which is 100 to 200 kilo pascals lower than in the first embodiment.

By supplying the compressed air to the second pressure chamber 19, the second diaphragm 45 is pushed downwardly by a force larger than the elastic force of the coil spring 46 so that the bottom shaft 49 moves downwardly and a bottom end thereof pushes the diaphragm 35 which is fixed to the valve body 30.

The stroke of the valve body 30 is controlled by the position of the dial 55 which is arranged at the top portion of the top shaft 48 similar to the first embodiment, and therefore the valve body 30 is slightly apart from the valve seat 11 so as to open the opening plane 11a. The flow rate of the fluid flowing into the flow control device 1A through the inlet port 21 is about 0.5 liters per minute which is less than the basic flow rate of 4 to 35 liters per every minute; therefore, the fluid supplied from the inlet port 21 flows into the outlet port 25 by the minimal flow rate in about 0.5 liters per minute.

As explained above, due to the flow control device 1A of the second embodiment, it is possible to precisely move the valve body for the minimal stroke so that the fluid flows at the minimal flow rate by the pressure of the compressed air which is relatively lower than the compressed air used in the first embodiment, further to the effects of the first embodiment.

Further to the dial 55, of the above embodiments, which acts as the minimal flow control device by using a double nut locking, the following modified embodiments may be used.

Figure 3:
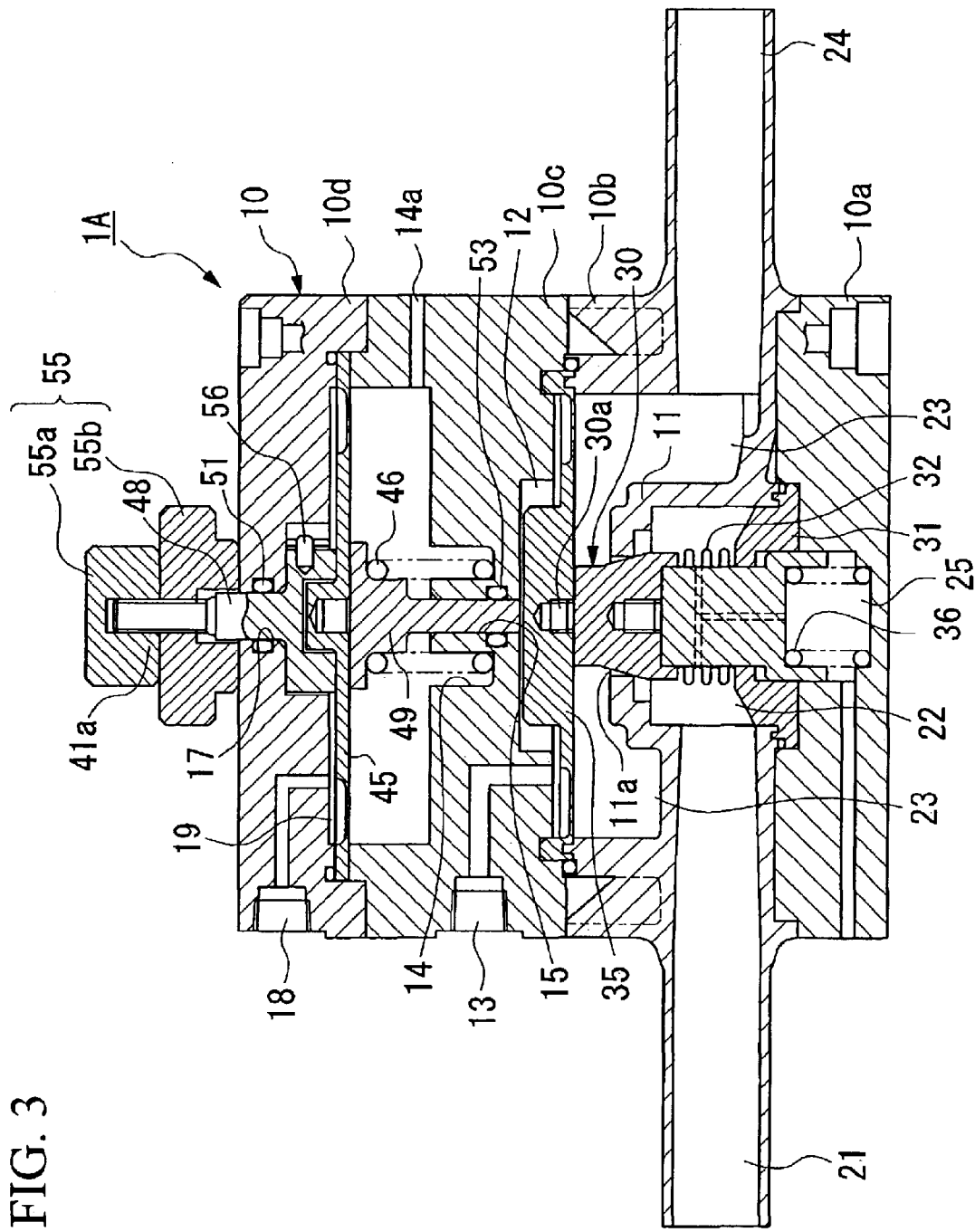
FIG. 3 is a cross sectional view of the second embodiment of the present invention which explains a structure and a mechanism of the flow control device.

For instance, plural holes may be formed in the top portion of the shaft portion 41 in FIG. 1 or in the top portion of the top shaft 48 in FIG. 3, perpendicular to the axis of the shaft portion 41 or the top shaft 48, so as to insert a fixing member. The fixing member is inserted into any one of the holes so that the fixing member contacts the top face of the flow control device 1A so as to limit the movement of the shaft portion 41 or the top shaft 48 for downwardly.

By selecting any one of the holes and inserting the fixing member into a selected hole, it is possible to control the minimum flow rate of the fluid in a progressive manner. That is, the stroke of the valve body 30 can be defined by distances between the holes.

What is claimed is:

1. A flow control device comprising:

an inlet port through which fluid is supplied;

an outlet port through which the fluid is delivered;

a valve body which is arranged in a passage between the inlet port and the outlet port so as to open and close the passage;

a valve body guide means which moves said valve body so as to allow the fluid in said passage to flow at a flow rate which is lower than a basic control rate of said flow control device, said valve body guide means pushing down and pulling up said valve body; and a fine controller which controls a range of movement of said valve body, wherein said valve body guide means comprises a piston which is movable relative to said valve body along an axis of the valve body, said fine controller controls a range of movement of said piston, and a pressure control diaphragm which drives said valve body by a pressure of compressed air which acts on one face of said pressure control diaphragm and which is driven by said piston.

2. A flow control device according to claim 1, wherein said valve body guide means is arranged along a direction along which said valve body moves.

3. A flow control device according to claim 1, wherein said valve body guide means is arranged coaxial to said valve body.

4. A flow control device according to claim 1 wherein said piston is urged by compressed air.

5. A flow control device comprising:

an inlet port through which fluid is supplied;

an outlet port through which the fluid is delivered; a valve body which is arranged in a passage between the inlet port and the outlet port so as to open and close the passage;

a valve body guide means which moves said valve body so as to allow the fluid in said passage to flow at a flow rate which is lower than a basic control rate of said flow control device, said valve body guide means pushing down and pulling up said valve body; and a fine controller which controls a range of movement of said valve body, wherein said valve body guide means comprises a pneumatic actuator which is movable relative to said valve body along an axis of the valve body, said fine controller controls a range of movement of said pneumatic actuator, and a pressure control diaphragm which drives said valve body by pressure of compressed air, which acts on one face of said pressure control diaphragm, and which is driven by said pneumatic actuator.

* * * * *